United States Patent [19]

Klumpes

[11] 4,068,111
[45] Jan. 10, 1978

[54] PROCESS OF WORKING IMPERFECTIONS OR DEFECTS ON GENERALLY THICKWALLED METAL WORKED-PIECES

[75] Inventor: Hans Klumpes, Klaaswaal, Netherlands

[73] Assignee: De Rotterdamsche Droogdok Maatschappij B.V., Rotterdam, Netherlands

[21] Appl. No.: 606,210

[22] Filed: Aug. 20, 1975

[51] Int. Cl.² .............................................. B23K 25/00
[52] U.S. Cl. ............................... 219/73.11; 219/137 R
[58] Field of Search .................. 219/73 A, 73 R, 76, 219/137 R; 228/119

[56] References Cited

U.S. PATENT DOCUMENTS

| | | | |
|---|---|---|---|
| 2,840,685 | 6/1958 | Muller | 219/137 R X |
| 3,487,530 | 1/1970 | Ely | 228/119 |
| 3,885,121 | 5/1975 | Dudko et al. | 219/73 A |
| 3,891,821 | 6/1975 | Evertz | 219/137 R X |
| 3,920,948 | 11/1975 | Schokkenbroek | 219/73 R X |

Primary Examiner—J. V. Truhe
Assistant Examiner—N. D. Herkamp
Attorney, Agent, or Firm—Fleit & Jacobson

[57] ABSTRACT

A method of repairing casting defects of cast iron workpieces by removing material from the work to provide a smooth cavity, preheating flux material by resistance heating thereof to its melting temperature and filling the cavity by electroslag welding.

2 Claims, 4 Drawing Figures

PROCESS OF WORKING IMPERFECTIONS OR DEFECTS ON GENERALLY THICKWALLED METAL WORKED-PIECES

The present invention relates to a process of working imperfections or defects on generally thick-walled metal work-pieces, in particular repairing casting defects of cast iron work-pieces. Thick-walled metal work-pieces, in particular cast iron work-pieces may show after the casting process unwanted surface defects, generally leading to the rejection of these work-pieces.

In case of cast iron work-pieces, these defects generally consist of holes (shrink holes) appearing upon removing or cutting the gates and risers or runners. This is caused by the much slower cooling down of the bulky work-piece than the cooling down of the risers and runners. The more quickly solidified risers and runners no longer can supply material upon the solidification of the work-piece, which causes shrink holes below the risers and runners in the work-piece. Such cast iron work-pieces cannot be used anymore, because they are unsuitable for further working. As a matter of course this is economically in particular unfavourable.

An object of the present invention is to provide a process for repairing defects of metal work-pieces, using as the material to be added the same material as the material of the work-piece to be worked, such that a failureless, continuous and metallically equivalent transition is obtained between the work-piece and the added, solidified material. In this process advantageously use is made of some typical characteristics of the electro-slag welding process.

In a electro-slag welding process the heat is generated by the current flowing through the liquefied slag, heating this slag because of its electrical resistance. One of the characteristics of the electro-slag welding process is the absence of an electrical arc, so that this is a particularly quiet process. A slag or flux suitable for use in obtaining the desired nonarcing condition might be the AN-25 flux, which is electrically conducting in the solid state. The use of such flux is discussed in the textbook *Electroslag Welding*, published by the American Welding Society, Inc., New York, 1962, and specifically the composition of such suitable slag is set forth in Chapter 8, page 102. Moreover with an electro-slag welding process melt down velocities can be reached which are many times higher than with an arc welding process, for instance the submerged arc process and the manual welding process. The slag, reaching during this process temperatures between 1500° and 2000° C has a lower melting point and specific weight than the material of the work-piece. Because the slag and the material of the work-piece do not mix in the liquid phase, the slag will remain floating on the material, excluding the surrounding atmosphere.

The above object is obtained by the process of the present invention, which is characterized in that the surface of the work-piece at the location of the defect is removed to such extent, that a cavity is formed having an errorless, more or less smooth and rounded-off surface, that this cavity is filled with such a quantity of slag powder, which is heated to such a temperature, by means of resistance heating by electrical current passage, supplied by a non-consumable electrode reaching into the slag, that a liquid slag is formed having a layer thickness of 30–50 mm, that thereafter the molten slag is kept during a certain time by the current passage at a temperature above the melting temperature of the material of the work-piece, until the wall surface in the cavity reaches the melting temperature and the work-piece in the vicinity of the cavity is sufficiently pre-heated, that thereafter the non-consumable electrode is quickly replaced by a consumable electrode, consisting of the same material as the work-piece to be worked, and positioned such that this consumable electrode is emerged in the centre of the molten slag, that immediately thereafter a such current intensity is passed through the consumable electrode through the slag to the work-piece, that the consumable electrode melts and that the drops of molten electrode material sink down through the liquid slag bath, gradually filling the cavity completely with the material of the molten electrode, such that a continuous, metallically equivalent transition between the added material and the work-piece is obtained.

For repairing cast iron work-pieces the surface with the defect will be worked first such, that a cavity is obtained with a rounded-off, more or less smooth and errorless wall surface, in which the slag is heated by resistance heating, by means of a carbon electrode as a non-consumable electrode, and in which as the consumable electrode a cast iron electrode is used.

BRIEF DESCRIPTION OF THE DRAWINGS

The details of the invention will be apparent from the following description when read in connection with the accompanying drawings in which:

FIG. 1 shows a cross section of a portion of a cast iron work-piece 1 with riser or runner 2. Below the lower end of the runner 2 it is shown a cavity 3, developed upon cooling down and solidification of the casting, because this runner has a higher cooling down rate than the casting, having a greater volume. The cavity 3 appears upon cutting the runner 2.

FIG. 1 also shows in work-piece 1 by dotted lines the periphery of the cavity 4 to be bored out. As a matter of course the defect on the surface and in the material has to be completely within this cavity, so that the cavity itself has a more or less smooth and rounded-off surface, at the upper side joining the smooth outer surface of the work-piece.

FIG. 2 shows the same portion of the work-piece 1 with the cavity 4, now filled with molten slag 5 until a height of 30–50 mm thick layer. A carbon electrode 6 is submerged in this molten slag, the electrode of which reaches into the middle of the slag, which slag is heated by current passage to a such high temperature, that the wall surface of the cavity in the work-piece reaches the melting temperature.

The slag 4 also can be poured in powder-form in the cavity, after which it is molten by current passage by means of the carbon electrode 6. However, this slag can also be molten elsewhere and thereafter poured into the cavity, after which the carbon electrode further will heat the liquid slag.

This heating-up is proceeded until the material of the work-piece at the periphery of the cavity is preheated sufficiently and the wall of the cavity starts to melt. This is necessary for a correct connection with the welding material to be supplied afterwards. The time elapsing until the material of the work-piece is preheated sufficiently depends on different factors, such as the shape and thickness of the work-piece, the used welding current and the voltage.

If instead of the slag welding process an arc welding process should be used, for instance a submerged arc welding process, or manual welding process with cast iron as filler material, it would be necessary to pre-heat the complete cast iron work-piece until a temperature of 600°–700° C, which as a matter of course can be problematic for large work-pieces as far as the furnace capacity and working conditions are concerned.

In the process of the present invention the preheating constitutes a portion of the complete welding process itself and no separate heat sources are necessary, which as a matter of course is economically of advantage.

In the process of the present invention the preheating takes place within and from the cavity to be filled by welding material, from which the heat is transmitted into the work-piece. Therefore the cavity itself reaches the highest temperature and this temperature gradually decreases going further down into the casting or work-piece. This has two different advantages.

First the cavity will reach the highest temperature to be reached, namely the melting temperature. This reduces bonding failures between the cavity filler material and work-piece to nil. Secondly by the gradual decrease of the temperature the material of the work-piece will expand gradually too, so that the possibility of cracks will be nil too.

Figure 3:
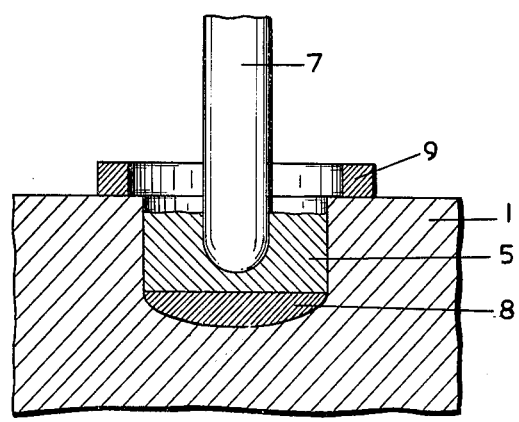
FIG. 3 is a cross sectional view of the casting showing the cavity being filled by electroslag welding

As soon as the material of the work-piece adjoining the cavity is preheated sufficiently and the wall of the cavity reaches the melting temperature, the carbon electrode is quickly replaced by a cast iron electrode 7, as shown in FIG. 3, filling by melting down the cavity 4. During this electro-slag welding process three phases can be distinguished in the casting, as shown in FIG. 3: a solidified cast iron 1, molten cast iron 8 and floating upon this the liquefied slag 5 within which the end of the cast iron electrode 7 is submerged. Mind however, that this is not a so-called submerged arc welding process, because no arc will be developed between the cast iron electrode 7 and the molten cast iron 8.

This melting process is continued until the cavity is filled completely with the molten cast iron. Preferably one will melt down so much additional material, that this will rise above the work-piece surface somewhat. To prevent flowing away molten material use is made therefor of a carbon ring 9 having a somewhat larger opening than the diameter of the cavity in the work-piece and placed around the cavity, which space can be filled with cast iron. The height of the carbon ring will be chosen such, that the molten cast iron will extend just enough above the work-piece surface and that upper level of the slag bath is in line with the upper edge of the carbon ring 9. A completely smooth surface can be obtained thereafter by grinding and working the extending solidified cast iron. The process of the present invention is such that no seam can be distinguished between the material of the work-piece 1 and the filler material, as shown, for instance, in FIG. 4, so that there will be a continuous, metallic transition between the material of the work-piece and the material in the cavity.

The electro-slag welding process is in particular suitable herefor, because by the absence of an arc this process will proceed much more quietly and without turbulence than in case of applying an electrical arc welding process, so that the possibility of new, interior defects will be practicaly nil. As disclosed above, relative to the textbook on electroslag welding by The American Welding Society, a flux which is electrically conducting in the solid state, i.e., a flux which will melt by electrical resistance in the conventional process without arcing, is that denoted by AN-25. Moreover an excellent refining of the molten material will take place by the intensive contact of the molten droplets of the consumable electrode, floating down through the slag, having a very high temperature. This will result in a cavity filling portion consisting of material containing a lower contents of sulphur, in case the material of the consumable electrode is of the same composition as the material of the work-piece, which is favourable for the material structure, so that the chance of cracks upon cooling can be regarded excluded.

In case an electric arc would be used in the welding process, as in the case of submerged arc welding, the metal drops first are transported over a relatively long distance through the electric arc and thereafter reach the molten slag which, however, is of less higher temperature. Because of this lower temperature and the less intense contact with the slag the refining will be drastically reduced if at all occurring.

In the process of the present invention no use is made of an electric arc and it is the current passage through the slag only which increases the temperature, so that this temperature can rise much higher, whilst the molten cast iron is much more homogeneously heated.

In order to obtain a continuously metallic transition between the portion welded in and the material of the work-piece there are a number of factors which are of importance, such as the dimensions of the electrode with respect to the cavity, the electric current strength and the electric voltage through and between electrode and work-piece respectively, as well as the pre-heat temperature.

Now some examples will be given of processes as disclosed in the present specification.

REPAIR OF CAST IRON

Figure 1:
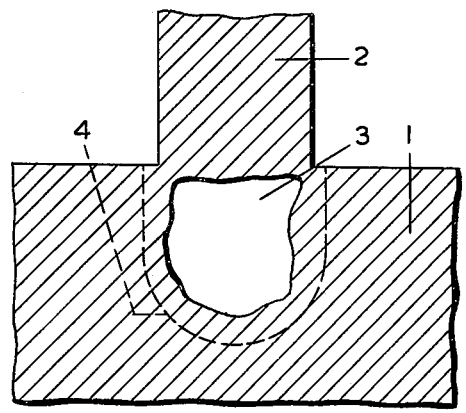
FIG. 1 is a cross sectional view of a defective casting.
Figure 2:
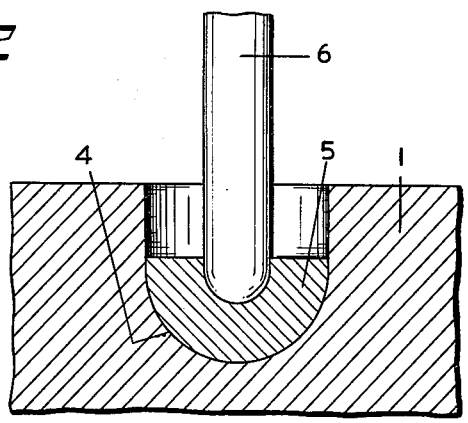
FIG. 2 is a cross sectional view of the casting showing a smooth cavity filled with molten slag.

In the repairing process of the present invention first the portion of the work-piece showing the defect will be bored or turned out, so that the shrink cavity is reformed to obtain a more or less rounded-off cavity as shown in FIG. 1 by the interrupted line 4. The dimensions of this cavity may be for instance: diameter cylindrical portion 70 mm, height of cylindrical portion 35 mm and a bottom being a half sphere having a radius of 35 mm.

The slag powder is molten by resistance heating, with a carbon electrode having a diameter of 25 mm (current strength 500 A, voltage about 32 V, slag pass level height 30 mm). Thus also the adjacent portions of the material of the work-piece 1 are heated. As soon as the temperature in the work-piece at a distance of about 40 mm from the wall surface reaches 400° C and the material of the work-piece which in the cavity is in contact with the slag, starts to melt, the carbon electrode is quickly replaced by a cast iron electrode (interchange time <10 sec.), having a diameter of 30 mm, working with a voltage of 35 V and a current of 1000 A, by which this consumable electrode is melted down in the cavity, so that a continuously metallic transition of welding metal to the base material is obtained. In order to fill the cavity until above the edge use is made of a carbon ring 9, around the opening of the cavity, in which the slag and molten metal can rise up. For a cavity with a diameter of 90 mm a cast iron electrode is used having a diameter of 50 mm with a voltage of 35 V and a current strength of 1200 A. Pre-heating of the slag and the work-piece is obtained by means of a carbon electrode having a diameter of 35 mm, a voltage of 32 V and a current of 700 A.

It will be understood that the present invention will not be limited to the above examples and that modifications and additions are possible without departing from the scope of the invention, as set forth in the following claims.

I claim:

1. A process of repairing imperfections or defects forming cavities in generally thick-walled, metal work-pieces comprising the steps of, machining the surface of the work-piece to remove therefrom metal contiguous to the defect cavity and thereby form a cavity having a smooth, continuous, rounded-off wall surface, introducing a selected quantity of slag powder in said cavity, resistance heating the slag powder in said cavity by the passage of an electric current from an electrode of non-consumable material extending partially into said slag powder to form a molten slag in said cavity having a depth of 30–50mm, maintaining said molten slag in the heated condition at a temperature above the melting temperature of the metal work-piece to permit the material of said cavity wall surface to reach its melting temperature and to preheat the metal of the work-piece in the vicinity of the cavity, quickly replacing the non-consumable electrode with an electrode of consumable material having the same composition as that of the work-piece, partially immersing said consumable electrode centrally within said molten slag and passing a current through said consumable electrode and said molten slag to said work-piece of an intensity for melting said consumable electrode so that the molten metal from said consumable electrode is deposited into said cavity through said molten slag to fill said cavity with a continuous, metallically equivalent transition between the molten metal deposited in said cavity and the cavity wall surface.

2. A process in accordance with claim 1 wherein said slag powder resistance heating step is carried out at a remote location and wherein said slag introducing step is carried out by introducing the remotely heated molten slag into said cavity.

* * * * *